United States Patent [19]

Kataoka et al.

[11] Patent Number: 6,061,111
[45] Date of Patent: *May 9, 2000

[54] REFLECTIVE LCD HAVING ORIENTATION FILM FORMED ON QUARTER WAVELAYER AND PLANARIZING FILM FORMED ON REFLECTOR LAYER

[75] Inventors: Hideo Kataoka; Tetsuo Urabe; Nobuyuki Shigeno, all of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/757,329

[22] Filed: Nov. 27, 1996

[30] Foreign Application Priority Data

Nov. 30, 1995 [JP] Japan .................................. 7-335773
Nov. 30, 1995 [JP] Japan .................................. 7-335774
Oct. 2, 1996 [JP] Japan .................................. 8-281351

[51] Int. Cl.$^7$ ...................... G02F 1/1335; G02F 1/1333; C09K 19/60
[52] U.S. Cl. .......................... 349/113; 349/122; 349/165
[58] Field of Search .................................. 349/113, 183, 349/165, 75, 95, 117, 122

[56] References Cited

U.S. PATENT DOCUMENTS

| | | | |
|---|---|---|---|
| 4,266,859 | 5/1981 | Togashi .................................. | 350/338 |
| 4,519,678 | 5/1985 | Komatsubara et al. ................. | 350/338 |
| 4,995,705 | 2/1991 | Yoshinaga et al. ..................... | 350/350 |
| 5,258,134 | 11/1993 | Yoshinaga et al. ..................... | 359/104 |
| 5,408,345 | 4/1995 | Mitsui et al. ............................. | 359/59 |
| 5,491,001 | 2/1996 | Mazaki et al. ............................ | 359/73 |
| 5,500,750 | 3/1996 | Kanbe et al. ............................. | 359/58 |
| 5,550,658 | 8/1996 | Yoshihiro ................................. | 359/49 |
| 5,576,860 | 11/1996 | Nakamura et al. ...................... | 359/70 |
| 5,579,142 | 11/1996 | Sawayama et al. .................... | 359/102 |
| 5,658,490 | 8/1997 | Sharp et al. .............................. | 349/96 |

FOREIGN PATENT DOCUMENTS 0 084 930 A1  4/1989  European Pat. Off. .
0 353 069 A2  1/1990  European Pat. Off. .

OTHER PUBLICATIONS

Proceedings of the SID, "Reflective Multicolor LCD (II): Improvement in the Brightness", Koiumi et al., vol. 29, No. 2, Jan. 1988, pp. 157–160.

Patent Abstracts of Japan, vol. 10, No. 254, (Matsushita) & JP 61 080225 A, Apr. 23, 1986.

Patent Abstract of Japan, Aug. 23, 1994, (Sharp Corp.) "Reflection Type Liquid Crystal Display Device", Takamatsu Toshiaki, Publication No. 06235931.

Patent Abstracts of Japan, Oct. 12, 1985, (Citizen Watch Co.), "Liquid Crystal Display Device", Masubuchi Sadao, Publication No. 60202425.

Patent Abstracts of Japan, Dec. 8, 1995, (Fuj Xerox Co. Ltd.) "Reflection Type Liquid Crystal Display Device", Yamamoto Shigeru, Publication No. 07318926.

Patent Abstracts of Japan, Feb. 27, 1986, (Sharp Corp.) "Glare Proof Mirror", Shirai Yoshihro, Publication No. 61041121.

Derwent Abstract, XP–002056998, (Samsung Electron Devices Co. Ltd.), Apr. 12, 1995.

*Primary Examiner*—Walter Malinowski
*Attorney, Agent, or Firm*—Hill & Simpson

[57] ABSTRACT

A reflective guest-host liquid crystal display device includes an optical reflective layer and a quarter wavelength plate (¼ wavelength phase shifter) inside the device provides improved contrast an brightness of the display with a paper-white tone.

5 Claims, 11 Drawing Sheets

A:  (MESOGEN GROUP)

B: $-(CH_2)-n, -(CH_2-CH_2-O)_n-$ (ACRYLIC) (METHACRYLIC) (METHYLSILO-XANE)

REFLECTIVE LCD HAVING ORIENTATION FILM FORMED ON QUARTER WAVELAYER AND PLANARIZING FILM FORMED ON REFLECTOR LAYER

BACKGROUND OF THE INVENTION

1. Field of the Invention

The present invention relates to a reflective guest-host liquid crystal display device. More particularly, the present invention relates to a technique for improving the utility efficiency of the incident light by providing a quarter wavelength plate ($\lambda/4$ phase shifter) and an optical reflective layer within the device. Moreover, the present invention particularly relates to a technique to increase the brightness of the display by diffusely and efficiently emanating the reflected light.

2. Description of the Related Art

Although liquid crystal devices according to various modes are available, Tn modes or STN modes respectively employing twist oriented or super-twist oriented nematic liquid crystals are predominantly used in these days. However, it is difficult to achieve a bright display according to these modes, the working principle of which requires one pair of polarizing plates absorbing light, resulting in low transmittance. In addition to the above TN and STN modes, guest-host modes utilizing dichroic dyes have been developed. Guest-host liquid crystal display devices display images by utilizing the anisotropy of the absorption coefficient of the dichroic dyes added to the liquid crystal. When an electric field is applied to a liquid crystal, which employs a dichroic dye having a long-cylindrical structure, so as to alter the orientation direction of the liquid crystal molecules, the orientation direction of the dye molecules also changes because they are aligned along the liquid crystal molecules. Since the coloring of the dye changes depending on the orientation direction, the colored state and the colorless state of the liquid crystal display can be switched by applying a voltage.

FIG. 6 shows a structure of a Heilmeier-type guest-host liquid crystal display device. FIG. 6A illustrates a state of a liquid crystal to which no voltage is applied, and FIG. 6B indicates another state of the liquid crystal to which a voltage is applied. This liquid crystal display device employs a p-type dye and a nematic liquid crystal ($N_p$ liquid crystal) which exhibits positive dielectric anisotropy. Since the p-type dichroic dye has an absorbance axis substantially parallel to the molecular axis, it strongly absorbs the polarization component Lx which is parallel to the molecular axis, and scarcely absorbs the polarization component Ly which is perpendicular to the polarization component Lx. In the liquid crystal shown in FIG. 6A to which no voltage is applied, the polarization component Lx included in the incident light is strongly absorbed in the p-type dye, and the display is thereby colored. Meanwhile, in the liquid crystal shown in FIG. 6B to which a voltage is applied, the molecules of the $N_p$ nematic liquid crystal having positive dielectric anisotropy are oriented perpendicular to the direction of the incident light in response to the applied electric field, and the molecules of the p-type dye are thereby aligned to the same direction as that of the liquid crystal molecules. Therefore, only a very small quantity of the polarization component Lx is absorbed in the dye and the display becomes substantially colorless. Another polarization component Ly included in the incident light is scarcely absorbed in the dichroic dye, regardless of whether a voltage is applied to the liquid crystal or not. Thus, in the Heilmeier-type guest-host liquid crystal display device, the polarization component Ly is removed by setting up a polarizing plate to improve the contrast of the resultant display.

In guest-host liquid crystal display devices employing the nematic liquid crystal, the dichroic dye added to the liquid crystal as a guest is oriented in a similar direction to the nematic liquid crystal, and it absorbs the polarization component which is parallel to the orientation direction of the liquid crystal and scarcely absorbs another polarization component which is perpendicular thereto. Therefore, for providing sufficient contrast for the display, a polarizing plate is set up in the incident side of the liquid crystal display device such that the incident light is polarized to the orientation direction of the liquid crystal. However, according to this method, 50% (in practice approximately 40%) of the incident light is lost in principle because of the polarizing plate, resulting in a dark display similarly to that of a TN mode. If the polarizing plate is simply removed, the absorbance ratio of the "on" state to the "off" state extremely decreases. Various kinds of improvements have been proposed to solve the above problems. For example, as is shown in FIG. 7, a reflective guest-host liquid crystal display device is proposed which has a quarter wavelength plate and a reflector at the outgoing side and which does not have a polarizing plate at the incident side. According to this system, the directions of the polarization components Lx and Ly in the incident path, which components are perpendicular to each other, are rotated at 90° C. in the reflection path by the quarter wavelength plate and replaced by each other. Thus, in the "off" state shown in FIG. 7A (i.e., absorption state), each of the polarization components Lx and Ly is absorbed during the incident path or reflection path. Meanwhile, in the "on" state shown in FIG. 7B (i.e., transmission state), both of the polarization components Lx and Ly are scarcely absorbed during the incident path and reflection path. Therefore, the utility efficiency of the incident light is significantly improved, resulting in a brighter display.

Since the quarter wavelength plate and the reflector are installed outside the device, a transmission liquid crystal display device must be employed for the above structure. In particular, when an active matrix structure is used for displaying moving pictures with excellent resolution, thin-film transistors for driving pixel electrodes are integrally formed on a substrate. Thus a certain part of the incident light is cut off in the transmission liquid crystal display devices because of the small aperture ratio of the pixels. Therefore, it is impossible to achieve significantly brighter display, even if the polarizing plate is removed from the device. FIG. 8 shows an example of the structure of liquid crystal display devices which have the quarter wavelength plates and reflectors inside the devices to solve the above problems. The display device shown in FIG. 8 is disclosed in Ser. No. 08/629,637 filed on Apr. 9, 1996 and Ser. No. 08/684,299 filed on Jul. 17, 1996. These applications are to be assigned to the assignee of the present application and incorporated in the present application as a reference.

In the present invention, the structure having a quarter wavelength plate and a reflector inside the device is referred to as "guest-host liquid crystal display device with quarter wavelength plate". As is shown in FIG. 8, the guest-host liquid crystal display device with quarter wavelength plate is composed of a first substrate 101 positioned at the side of incident light 100 and a second substrate 102 positioned behind the first substrate 101 with a predetermined space therebetween. In this space, a guest-host liquid crystal layer 103 is arranged at the side of the first substrate 101 and a quarter wavelength plate 104 is positioned at the side of the second substrate 102. Further, for applying a voltage to the guest-host liquid crystal layer 103, electrode layers 105 and 106 are provided at the side of the first substrate 101 and at the side of the second substrate 102, respectively. Furthermore, an optical reflective layer 107 is integrally formed with the electrode layer 106 at the side of the second substrate 102. The optical reflective layer 107 is provided between the second substrate 102 and the quarter wavelength plate 104 so as to substantially specularly reflect the incident light 100 and emanate reflected light 108. A passivation layer 109 is formed between the liquid crystal layer 103 and the quarter wavelength plate 104.

In general, for achieving brighter display, the optical reflective layer 107 and the electrode layer 106 are integrated, and reflective electrodes having the maximum aperture ratio, such as aluminum films, are used in the reflective guest-host liquid crystal display devices. However, since flat metal-film electrodes cause specular reflection, the visual angle is extremely restricted and a display with a metallic tone instead of a paper-white tone is obtained. For preventing the above phenomenon, it is proposed to finely roughen the surface of the optical reflective layer, which is made of a metal film, to increase the distribution of the reflection angles. According to this method, a process for roughening is required. Further, in the guest-host liquid crystal display device with quarter wavelength plate, the quarter wavelength plate 104 is required to be formed accurately along the roughness at a uniform thickness, which requirement is practically very difficult to fulfil. Furthermore, it is necessary to control the distribution of the inclination angles of the roughness for achieving an optimum visual angle, which fact does not fit with reality. As above mentioned, in the manufacture process of liquid crystal devices, numerous problems occur to finely roughen the surface of the optical reflective layer, i.e. a metal film.

In general, a metallic deposited film, such as an aluminum film, is formed as an optical reflective layer of a display device having a built-in reflector. Since this optical reflective layer is a substantially specular reflector, it specularly reflects the incident light and exhibits high directivity. Therefore, relating to the external illumination light, the brightness of the display extremely varies according to the visual angle and it becomes hard to see the display. In addition, when the optical reflective layer is almost a specular reflector, it exhibits a metallic tone which is not always suitable for a background of the display.

SUMMARY OF THE INVENTION

In view of the above-mentioned problems of the prior art, it is an object of the present invention to provide a guest-host liquid crystal display device with quarter wavelength plate, which display device has a bright display and a broad visual angle. This object is achieved by the following means:

As a basic structure, a reflective guest-host liquid crystal display device according to the present invention includes a first substrate through which light enters from the front and a second substrate positioned behind the first substrate with a predetermined space therebetween. Within the space, a guest-host liquid crystal layer is provided at the side of the first substrate and a quarter wavelength plate is provided at the side of the second substrate. Electrode layers are respectively formed on the first and second substrates so as to apply a voltage to the guest-host liquid crystal layer. An optical reflective layer is formed integrally with or separately from the electrode layer positioned at the side of the second substrate. The optical reflective layer is provided between the second substrate and the quarter wavelength plate, and it substantially specularly reflects the incident light. The present invention is characterized by an optical scattering layer provided between the first substrate and the guest-host liquid crystal layer. According to an embodiment, the optical scattering layer is composed of a transparent material which is obtained by dispersing fine particles in a resin, and the light reflected from the back is scatteredly emanated to the front by the optical scattering layer. Preferably, the electrode layer positioned at the side of the first substrate is formed on the optical scattering layer having a planar surface and is in contact with the guest-host liquid crystal layer.

Another embodiment of the optical scattering layer is a micro-lens array. It is preferred that the micro-lens array is: a transparent resin which is filled into numerous dimples prepared by etching the inner surface of the first substrate made of glass and the refractive index of which differs from that of the glass; or a combination of a transparent-resin layer, which is formed on the inner surface of the first substrate made of glass and which has a refractive index substantially the same as that of the glass, and a transparent resin, which is filled into numerous dimples formed on the surface of the transparent-resin layer by stamping and which has a refractive index different from that of the glass.

According to the present invention, an optical scattering layer is formed on the first substrate the side of which is regarded as both the incident and outgoing sides, An optical reflective layer serving as a specular reflector is formed on the second substrate the side of which is regarded as the reflection side. The reflected light coming from the back, i.e. the side of the second substrate, is diffusely emanated by the optical scattering layer positioned in the front. As a result, the outgoing light has a relatively wide angle distribution, thus the visual angle is improved and a display with a paper-white tone instead of a metallic tone can be obtained. Furthermore, the distance between the optical scattering layer and the optical reflection layer significantly decreases because the optical scattering layer is formed on the inside of the first substrate instead of the outside thereof. Therefore, between the optical reflective layer and the optical scattering layer, very little transverse diffusion occurs in the reflected light, where the resultant display achieves excellent contrast and brightness. By using a micro-lens array, the reflected light from the back, i.e, the side of the second substrate, can be efficiently emanated to the front in a scattered manner and, further, the portion of the incident light surface-reflected by the optical scattering layer can be reduced.

As a basic structure, a reflective guest-host liquid crystal display device according to another embodiment of the present invention includes a first substrate positioned at the incident side, a second substrate positioned opposed to the first substrate with a predetermined space therebetween, a guest-host liquid crystal layer provided at the side of the first substrate within the space, an optical reflective layer positioned at the side of the second substrate within the space, a quarter wavelength plate positioned between the guest-host liquid crystal layer and the optical reflective layer, and electrode layers respectively formed on the first and second substrates so as to apply a voltage to the guest-host liquid crystal layer. This embodiment is characterized in that the surface of the optical reflective layer is roughened so as to scatter light.

Preferably, for levelling the roughness, a transparent planarization layer is formed between the optical reflective layer and the quarter wavelength plate. The quarter wavelength plate is preferably composed of a polymer liquid crystal uniaxially oriented along the surface of the planarization layer. More preferably, the optical reflective layer is composed of a roughened resin film and a metal film which is formed on the surface of the resin film. Further, the resin film is preferably a photosensitive-resin film patterned unevenly by a photolithographic process. Furthermore, both sides of the guest-host liquid crystal layer are preferably in contact with one of the electrodes.

According to the construction described above, the surface of the built-in optical reflective layer of the reflective guest-host liquid crystal display device is roughened for scattering light. Thus, different from the specular reflector, the optical reflective layer diffusely reflects incident light and emanates it at an angle of a relatively wide range. Therefore, a clear display can be observed at a relatively wide visual angle, in other words, a much brighter display can easily be seen. In addition, different from metallic tones of conventional optical reflective layers which specularly reflect light, the optical reflective layer of this embodiment which scatteredly reflects light has a paper-white tone, i.e. a preferred tone for background. In a preferred embodiment of the present invention, a transparent planarization layer is formed between the optical reflective layer and the quarter wavelength plate for planarizing the roughness. The quarter wavelength plate is composed of a polymer liquid crystal material which is uniaxially oriented along the surface of the planarization layer. Since the quarter wavelength plate is formed on the planarization layer, the thickness thereof is uniform and the polymer liquid crystal is substantially uniaxially oriented along the surface of the planarization layer. Therefore, the thickness and the optical anisotrophy of the quarter wavelength plate is substantially completely controlled, resulting in satisfactory optical characteristics.

In addition to reflective guest-host liquid crystal display devices, the present invention includes ordinary types of reflective display devices. As a basic structure, a reflective display device according to the present invention includes a first substrate through which light enters from the front and a second substrate positioned behind the first substrate with a predetermined space therebetween. An electro-optical layer is held within the space. Electrode layers are respectively formed on the first and second substrates so as to apply a voltage to the electro-optical layer. An optical reflective layer is formed integrally with or separately from the electrode layer positioned at the side of the second substrate, and it substantially specularly reflects the incident light coming from the side of the first substrate. This embodiment is characterized by an optical scattering layer provided between the first substrate and the electro-optical layer. The optical scattering layer is composed of a transparent material which is obtained by dispersing fine particles in a resin, and the light reflected from the back is scatteredly emanated to the front by the optical scattering layer.

The present invention also includes a reflective guest-host liquid crystal display device, in which surface reflection caused by an optical scattering layer is suppressed. As a basic structure, this reflective guest-host liquid crystal display device includes a first substrate through which light enters from the front and a second substrate positioned behind the first substrate with a predetermined space therebetween. Within the space, a guest-host liquid crystal layer is provided at the side of the first substrate and a quarter wavelength plate is provided at the side of the second substrate. Electrode layers are respectively formed on the first and second substrates so as to apply a voltage to the guest-host liquid crystal layer. An optical reflective layer is formed integrally with or separately from the electrode layer positioned at the side of the second substrate. The optical reflective layer is provided between the second substrate and the quarter wavelength plate, and it substantially specularly reflects the incident light. An optical scattering layer is provided between the first substrate and the guest-host liquid crystal layer. This embodiment is characterized in that the optical scattering layer is composed of a micro-lens array, by which the light reflected from the back is scatteredly emanated to the front. It is preferred that the micro-lens array is: a transparent resin which is filled into numerous dimples prepared by etching the inner surface of the first substrate made of glass and the refractive index of which differs from that of the glass; or a combination of a transparent resin layer, which is formed on the inner surface of the first substrate made of glass and which has a refractive index substantially the same as that of the glass, and a transparent resin, which is filled into numerous dimples formed on the surface of the transparent resin layer by stamping and which has a refractive index different from that of the glass.

DESCRIPTION OF THE PREFERRED EMBODIMENT

The present invention will be better understood from the following description of the preferred embodiments taken in conjunction with the accompanying drawings.

Figure 1:
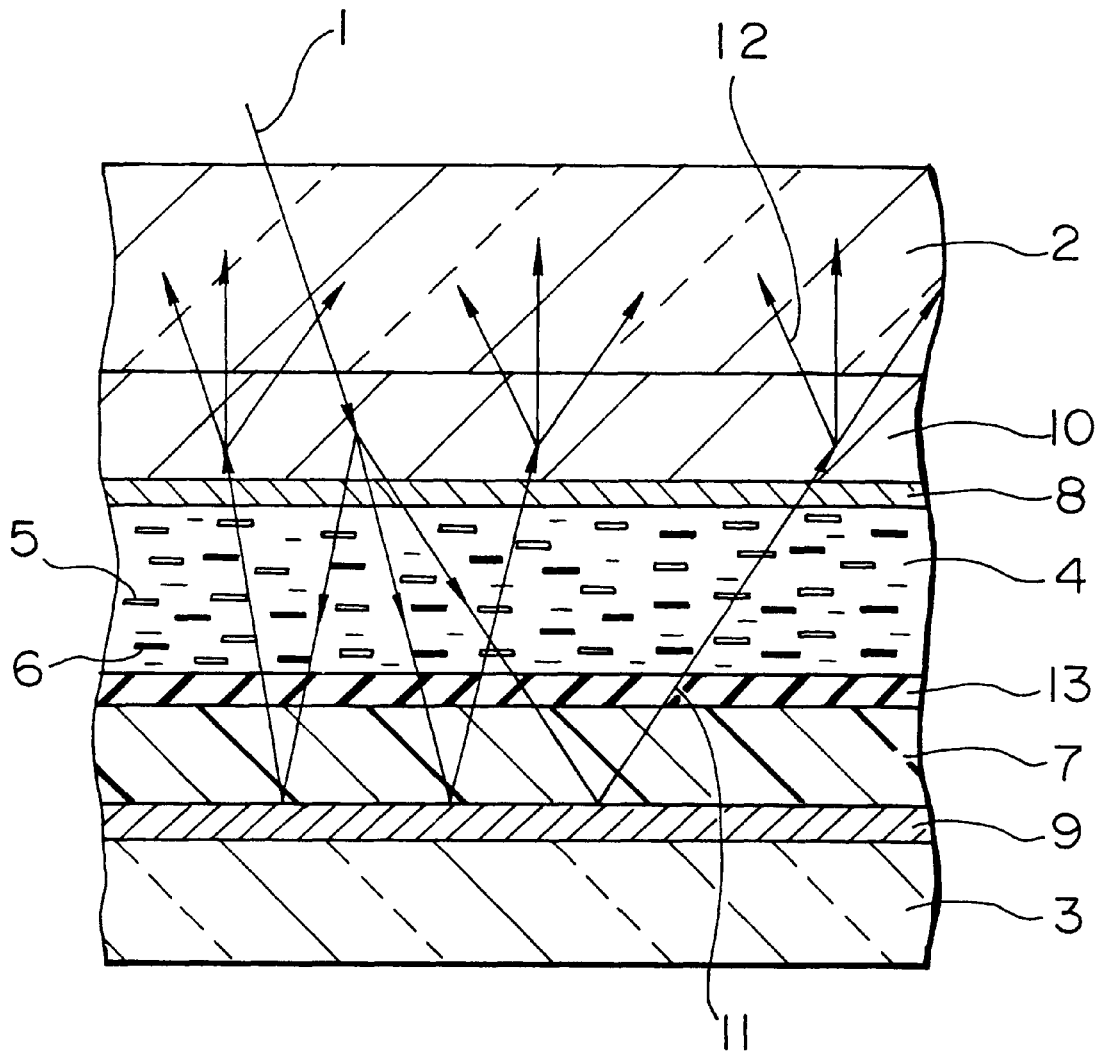
FIG. 1 is a fragmentary sectional diagram showing a basic structure of a reflective guest-host liquid crystal display device incorporated into the present invention.

FIG. 1 is a fragmentary sectional diagram showing a basic structure of a reflective guest-host liquid crystal display device incorporated into the present invention. A so-called reflective guest-host liquid crystal display device with quarter wavelength plate is shown in the figure, where the device is equipped with an optical reflective layer and a quarter wavelength plate therein. A first substrate 2, through which incident light 1 enters from the front (i.e., the observer's side). A second substrate 3 is formed behind the first substrate 2 with a predetermined space therebetween. Within the space, a guest-host liquid crystal layer 4 is positioned at the side of the first substrate 2. For example, the guest-host liquid crystal layer 4 may essentially consist of a mixture of a nematic liquid crystal 5 and a dichroic dye 6. Also within the space, a quarter wavelength plate 7 is arranged at the side of the second substrate 3. For applying a voltage to the guest-host liquid crystal layer 4, electrode layers 8 are provided for the first substrate 2 and the second substrate 3 respectively. Furthermore, between the second substrate 3 and the quarter wavelength plate 7, an optical reflective layer 9 is formed integrally with or separately from the electrode layer 8 positioned at the side of the second substrate 3 and it substantially specularly reflects the incident light 1. In this embodiment, the optical reflective layer 9 and the electrode layer 8 are integrally formed. This display device is characterized by an optical scattering layer 10 positioned between the first substrate 2 and the guest-host liquid crystal layer 4. The optical scattering layer 10 is composed of a transparent material obtained by dispersing fine particles in a resin, and reflected light 11 coming from the back is scatteredly emanated to the front by the optical scattering layer 10. As a result, outgoing light 12 which is scattered over a wide range emerges from the first substrate 2. The electrode layer 8 at the side of the first substrate 2 is formed on the optical scattering layer 10 having a planarized surface and is in contact with the guest-host liquid crystal layer 4. Further, a passivation layer 13 is formed between the guest-host liquid crystal layer 4 and the quarter wavelength plate 7. The surfaces of the upper electrode layer 8 and the passivation layer 13 are oriented, thereby aligning the guest-host liquid crystal layer 4 (for example, homogeneously). The present invention can be widely applied to reflective display devices employing electro-optical layers, in addition to guest-host liquid crystal display devices.

In a guest-host liquid crystal display device with quarter wavelength plate incorporated into the present invention, the optical reflective layer 9 serving as a specular reflector is positioned at the side of the second substrate 3, which is positioned at the back, and the optical scattering layer 10 diffusing light is formed on the inner surface of the first substrate 2 positioned in the front. The incident light 1 is diffused to some extent by the optical scattering layer 10 and then substantially specularly reflected by the optical reflective layer 9. The reflected light 11 is diffused by the optical scattering layer 10 and the outgoing light 12 thereby emerges to the front. Diffused by the optical scattering layer 10, the outgoing light 12 emerges at an angle of a relatively wide range, resulting in an improvement in visual angle. Further, since the reflected light 11 is converted to the scattered outgoing light 12 by the optical scattering layer 10, a display with a paper-white tone instead of a metallic tone is achieved. Furthermore, the distance between the optical scattering layer 10 and the optical reflection layer 9 significantly decreases because the optical scattering layer 10 is formed on the inside of the first substrate 2, instead of the outside thereof. Therefore, transverse diffusion of the reflected light 11 passing through the guest-host liquid crystal layer 4 is restricted as little as possible, where the resultant display achieves a high degree of contrast without deterioration in resolution.

The film-forming process of the layers adjacent to the second substrate will be described in detail with reference to FIG. 1. First, a second substrate 3 composed of glass, etc. is washed and then a metal film is formed thereon as an optical reflective layer 9 by sputtering or vacuum depositing. The metal film is patterned into a predetermined shape and processed as an electrode layer. The resultant reflective electrode is coated with an undercoat orientation film. The undercoat orientation film is rubbed along a predetermined shape. Further, a polymer liquid crystal material is applied to the undercoat orientation film. A polymer liquid crystal having side chains, such as a polymer having mesogen groups (i.e. a benzoate) as pendants, can be used for this material. This polymer liquid crystal is dissolved in a mixture of cyclohexanone and methyl ethyl ketone (8:2) at 3 to 5% by weight. By spin-coating the resultant solution at 1,000 rpm, the polymer liquid crystal is film-formed on the second substrate 3. The second substrate 3 is then heated to a temperature at which the polymer liquid crystal reaches an optical isotropic state. By cooling the second substrate 3, the polymer liquid crystal is gradually cooled to room temperature passing through the nematic phase. In the nematic phase, the polymer liquid crystal is aligned along the direction of rubbing of the undercoat orientation film, and the desired uniaxial orientation can be thus achieved. The resultant uniaxial orientation is fixed by cooling the second substrate 3 to room temperature. According to the above-mentioned annealing, the liquid crystal molecules contained in the polymer liquid crystal material are uniaxially oriented, providing a desired quarter wavelength plate 7. Further, a passivation layer 13, e.g. PVA film, is formed on the quarter wavelength plate 7. By rubbing the passivation layer 13 in a predetermined direction, a homogeneous orientation (i.e, horizontal orientation) can be attained in the guest-host liquid crystal layer 4 in contact with the passivation layer 13. The passivation layer 13 is arranged between the guest-host liquid crystal layer 4 and the polymer liquid crystal material composing the quarter wavelength plate 7, and serves as a blocking layer. The direction of rubbing of the passivation layer 13 and that of the undercoat orientation film cross each other at 45°. In addition, the quarter wavelength plate 7 can also serve as a color filter by dispersing dyes of the optical primaries (i.e., red, blue, and green) in separated regions.

Figure 2:
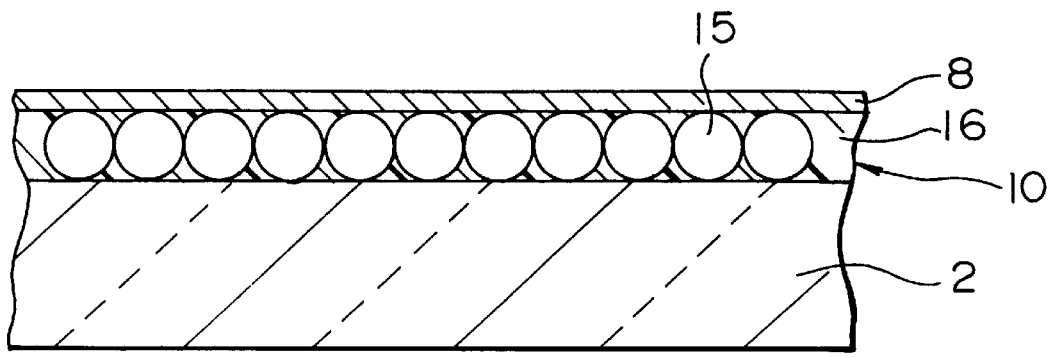
FIG. 2 is a fragmentary sectional diagram showing a practical example of an optical scattering layer formed on the inner side of a substrate positioned at the incident side of a reflective guest-host liquid crystal display device.

The film-forming process of the layers adjacent to a first substrate 2 will be described in detail with reference to FIG. 2. An optical scattering layer 10 is formed on the inner surface of the transparent first substrate 2 which is composed of glass, a polymer sheet, or the like, as is shown in FIG. 2. The optical scattering layer 10 is composed of a transparent material obtained by dispersing fine particles 15 in a resin 16. The surface of the transparent material is planarized and an electrode layer 8 is formed thereon. The electrode layer 8 is composed of a transparent conductive film, such as ITO, and formed by sputtering and the like. Further, the surface of the transparent electrode layer 8 is treated by rubbing. The optical scattering layer 10 which is a film composed of a transparent material is layered on the surface of the first substrate 2. To form the transparent material, the fine particles 15 composed of polymer beads, etc. are fixed in the resin 16 (polymer matrix), of which the refractive index is different from that of the fine particles 15. If required, this film may also be used as the first substrate 2 by increasing the thickness thereof. The refractive index and the size of the fine particles 15 are in the range of from 1.0 to 1.9 and from 1 to 10 μm, respectively. For example, the resin 16 (polymer matrix) may be a photosensitive acrylic resin having a refractive index of 1.5. The material obtained by dispersing the fine particles 15 in the photosensitive resin 16 is applied to the first substrate 2 and then subjected to ultraviolet radiation while being pressed. The optical scattering layer 10 which has a planar surface is thereby formed.

Figure 3:
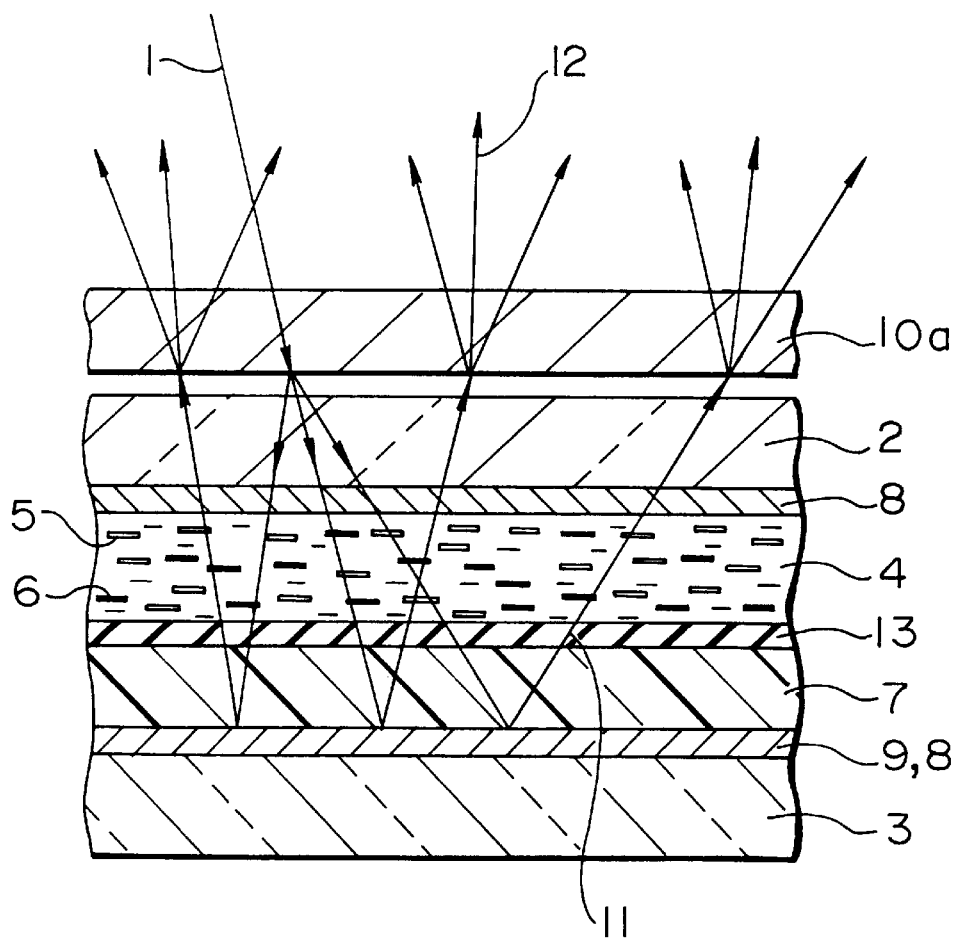
FIG. 3 is a fragmentary sectional diagram showing a reflective guest-host liquid crystal display device of a reference.

FIG. 3 is a fragmentary sectional diagram showing a reflective guest-host liquid crystal display device of a reference. In this reference, an optical scatterplate 10a is applied to the outside of a first substrate 2. In the reflective liquid crystal display device, an optical reflective layer 9 is positioned inside the cell so as to increase the aperture ratio and prevent deterioration of resolution due to parallax, which structure is generally employed for reflective liquid crystal display devices. Since the optical reflective layer 9 is a metal film, such as an aluminum film, it causes specular reflection. Thus the contrast and brightness of the display significantly vary according to the visual angle. Furthermore, the visibility of the display deteriorates because of the metallic tone thereof. According to this reference, the optical scatterplate 10a is installed to the outside of the first substrate 2 at the incident side to prevent the above problems. Incident light 1 is converted to reflective light 11 by the optical reflective layer 9 and then diffused by the optical scatterplate 10a such that outgoing light 12 emerges to the front at an angle of a wide range.

Figure 4:
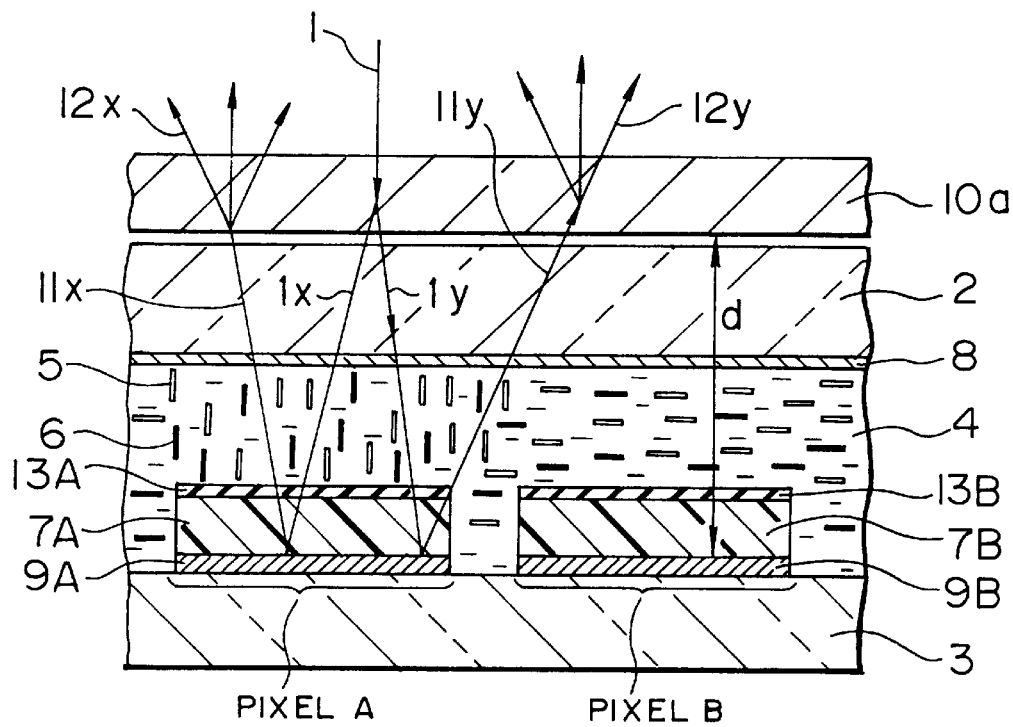
FIG. 4 is a fragmentary sectional diagram showing a reflective guest-host liquid crystal display device of another reference.

However, the contrast and resolution of the display deteriorate in the structure shown in FIG. 3, in which the optical scatterplate 10a is installed on the outside of the device. This phenomenon will be described in detail with reference to FIG. 4. For an easier understanding, an optical reflective layer 9, a quarter wavelength plate 7, and a passivation layer 13 are provided for each pixel adjacent to a second substrate 3, as shown by two pixels A and B in FIG. 4. When incident light 1 passes through the optical scatterplate 10a, it is backscattered and separates into, for example, incident light 1x and 1y. The incident light 1x is specularly reflected by the pixel A and converted to reflected light 11x. The reflected light 11x is scattered again by a portion of the optical scatterplate 10a corresponding to the pixel A, and is converted to diffused outgoing light 12x. If the pixel A transmits light and the pixel B does not transmit light, the incident light 1x is visible. However, the incident light 1y is specularly reflected by the pixel A and then enters into a portion of the optical scatterplate 10a corresponding to the pixel B, where it is diffused and converted to outgoing light 12y. In this case, the pixel B does not transmit light, in other words it should be black, however, the outgoing light 12y leaks therefrom, resulting in deteriorated contrast of black and white. To prevent the above phenomenon, it is effective to make distance d between the optical scatterplate 10a and the optical reflective layers 9A and 9B as small as possible. Thus, in the present invention, the optical scattering layer 10 is formed inside the first substrate 2, as is shown in FIG. 1. The distance between the optical scattering layer and the optical reflective layer is thereby reduced and light leakage becomes avoidable, resulting in satisfactory contrast.

Figure 5:
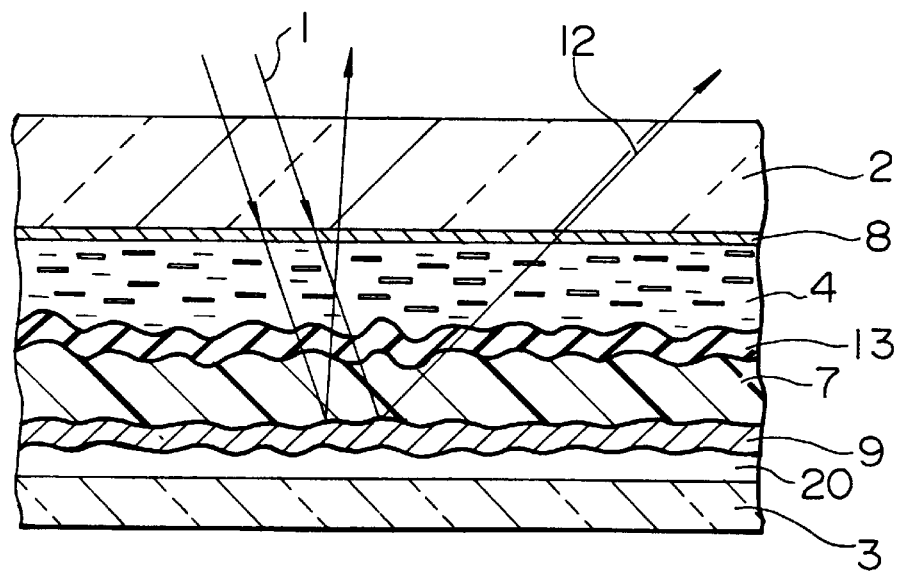
FIG. 5 is a fragmentary sectional diagram showing a reflective guest-host liquid crystal display device of another reference.
Figure 6A:
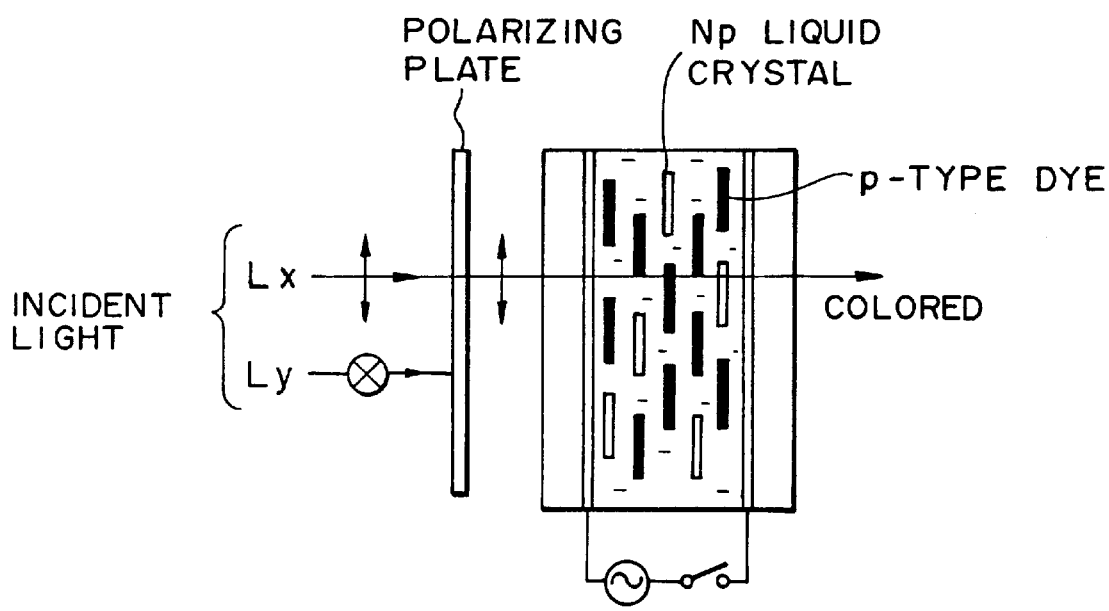
FIGS. 6A and 6B are diagrams showing a conventional transmission guest-host liquid crystal display device.
Figure 6B:
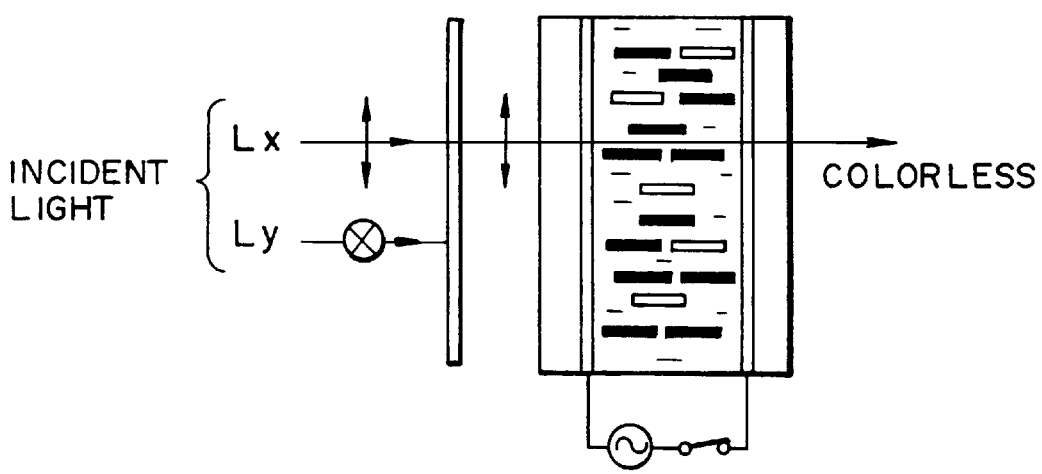
Figure 7A:
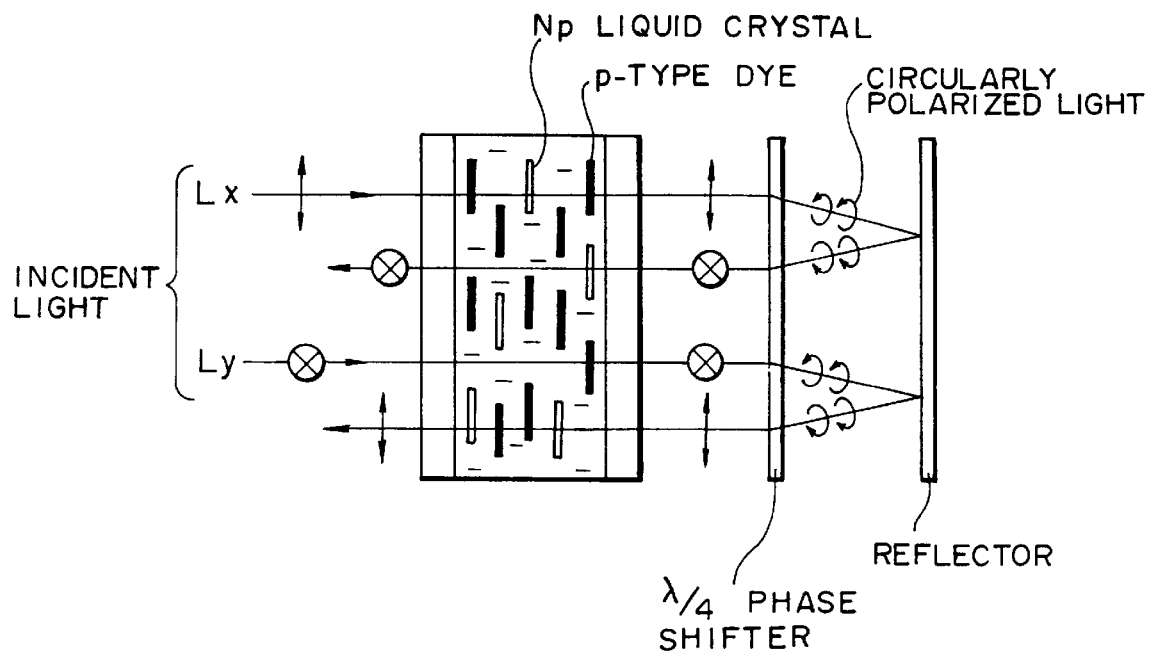
FIGS. 7A and 7B are diagrams showing a conventional reflective guest-host liquid crystal display device.
Figure 7B:
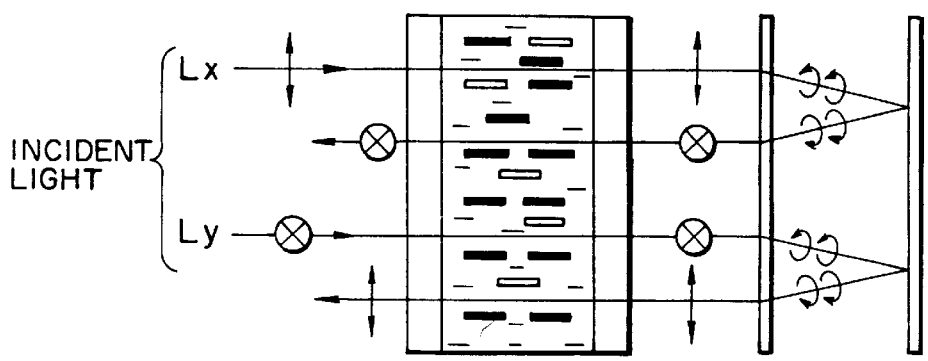
Figure 8:
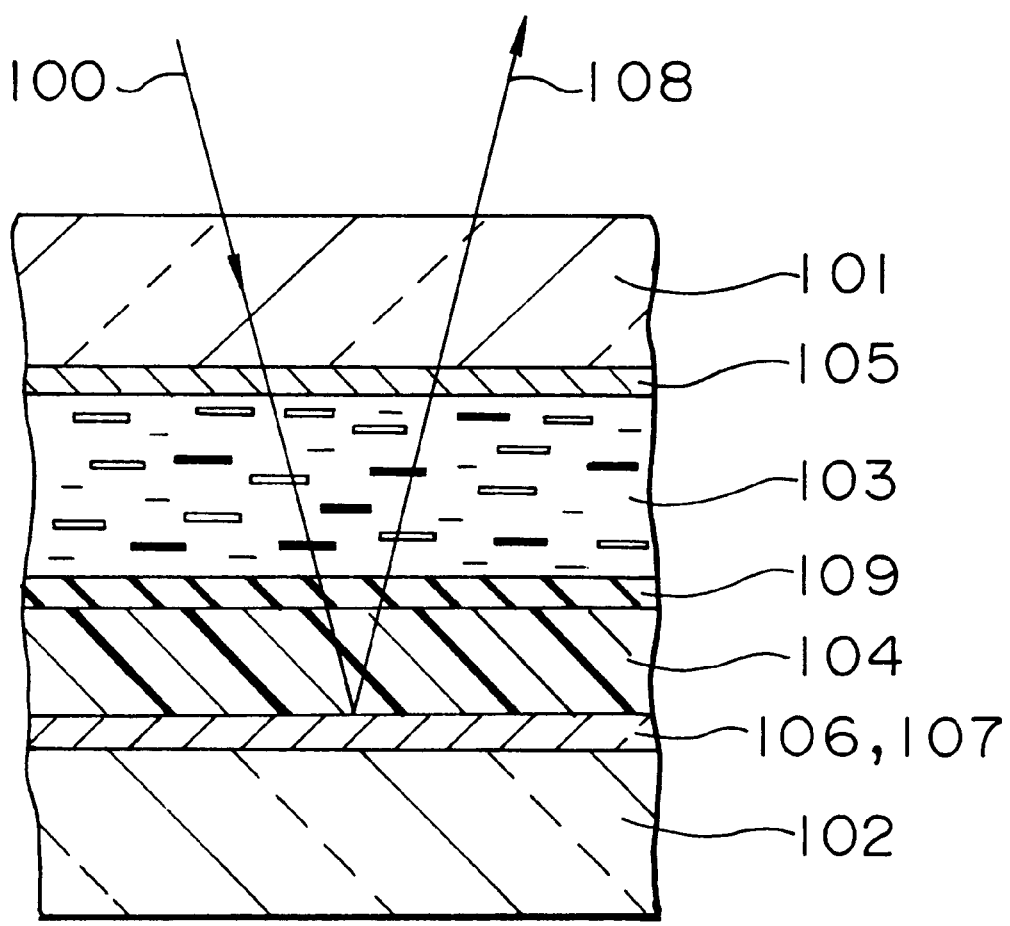
FIG. 8 is a fragmentary sectional diagram showing a reflective guest-host liquid crystal display device of a reference.

FIG. 5 is a fragmentary sectional diagram showing a reflective guest-host liquid crystal display device of another reference. An optical reflective layer 9 at the side of a second substrate 3 is finely roughened in this reference. Incident light 1 is thereby diffused and converted to outgoing light 12. Thus the visual angle increases and a display with a near paper-white tone can be achieved. According to this technique, a process for roughening the optical reflective layer 9 which is a metal film is necessary and, in general, an undercoat film 20 is required. To roughen the undercoat film 20, a photolithographic process or the like is added to the manufacturing process. Further, it is necessary to control the distribution of the inclination angles of the fine roughness to achieve optimum brightness in the resultant display, which is a requirement that is practically very difficult to fulfil. Furthermore, it is also very hard to accurately form a quarter wavelength plate 7 along the roughened surface of the optical reflective layer 9.

Figure 9:
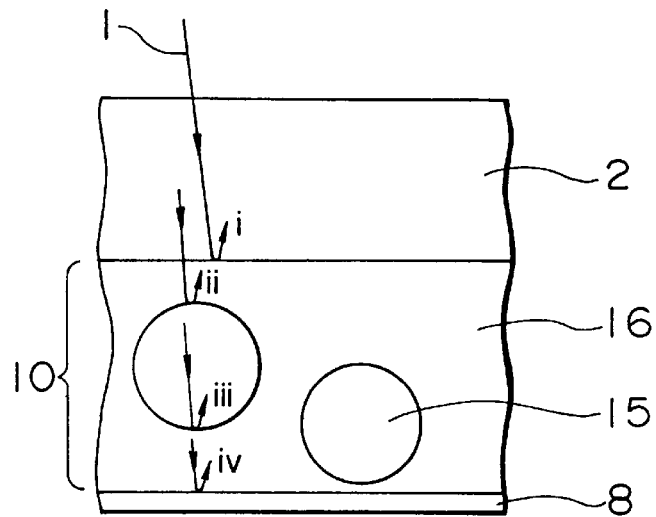
FIG. 9 is a diagram showing the inverse reflective scattering of the optical scattering layer shown in FIG. 2.

As is mentioned in the above, the reflected light coming from the back is efficiently scattered and emanated to the front by the optical scattering layer 10 shown in FIG. 2. However, the optical scattering layer 10 occasionally surface-reflects the incident light coming from the front to some extent, and the contrast in black display thereby decreases. This phenomenon will be described in detail with reference to FIG. 9. As is mentioned in the above, an optical scattering layer 10 is composed of a transparent material obtained by dispersing fine particles 15, e.g. polymer beads, in a resin 16. Incident light 1 coming from the front (i.e., the observer's side) is inversely reflected at a plurality of interfaces in a scattered manner, except for a portion of the incident light 1 not passing through the fine particles 15. Hereinafter, the above phenomenon will be called "inverse reflective scattering". Occasionally, "inverse reflective scattering" is called "backscattering". However, since the position of the optical reflective layer is referred to as the back in this specification, the term "inverse reflective scattering" is used instead of "backscattering" to avoid misunderstanding. The incident light 1 is inversely reflected by at least four interfaces, as is shown by (i) to (iv) in FIG. 9. In other words, the incident light 1 is reflected at the interface of the polymer matrix resin 16 and a first substrate 2 made of glass, etc; at the interface of the polymer matrix resin 16 and the fine particle 15 while passing from the polymer matrix resin 16 to the fine particle 15; at the interface of the fine particle 15 and the polymer matrix resin 16 while passing from the fine particle 15 to the polymer matrix resin 16; and at the interface of the polymer matrix resin 16 and a transparent electrode layer 8. As mentioned above, since the incident light 1 is reflected at four interfaces within the optical scattering layer 10, the inverse reflective scattering becomes remarkable. As a result, although almost no problem occurs during a white mode display, the contrast decreases during a black mode display and a so-called blurred display is observed.

Figure 10:
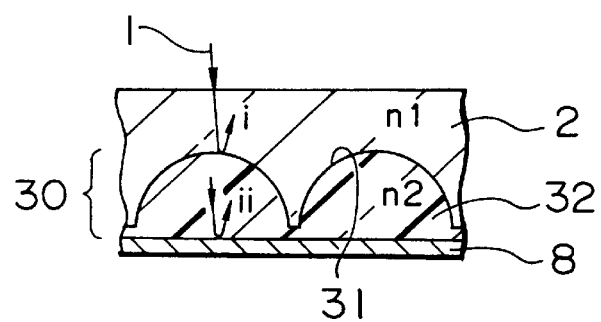
FIG. 10 is a fragmentary sectional diagram showing an optical scattering layer of another embodiment incorporated into the present invention.

FIG. 10 shows another construction of an optical scattering layer incorporated into the present invention. The inverse reflective scattering can be suppressed according to this embodiment. The optical scattering layer is composed of a micro-lens array 30 which is positioned between a first substrate 2 made of glass and a guest-host liquid crystal layer (not shown in the figure). The light reflected from the back is scatteredly emanated to the front by the optical scattering layer. The micro-lens array 30 is composed of a transparent resin 32 which is filled into numerous dimples 31 formed on the inner surface of the first substrate 2 by isotropic etching. When the refractive index of the glass composing the first substrate 2 is n1, the transparent resin 32, e.g., an epoxy resin, has a refractive index of n2, which is different from n1. Optional micro-lenses can be formed by isotropically etching the surface of the first substrate 2 and then applying an epoxy resin or the like on the surface. Optical scattering angle can be readily controlled by adjusting the refractive index of the transparent resin used for the micro-lenses. Meanwhile, with respect to incident light 1 coming from the front, the inverse reflective scattering is caused by the interface between the first substrate 2 and the transparent resin 32 indicated by (i) and the interface between the transparent resin 32 and a transparent electrode layer 8 indicated by (ii). As is apparent from comparison between FIGS. 9 and 10, the number of the reflective interfaces decreases from 4 to 2 when using the micro-lens array 30, thereby decreasing the inverse reflective scattering.

Figure 11:
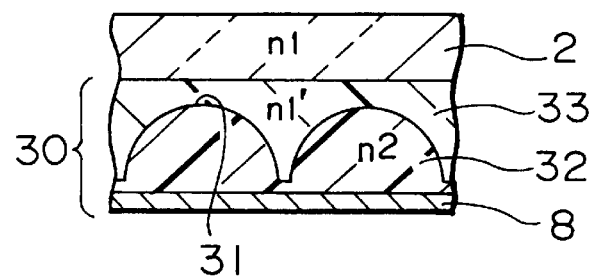
FIG. 11 is a fragmentary sectional diagram showing an optical scattering layer of another embodiment incorporated into the present invention.

FIG. 11 is a fragmentary diagram showing another embodiment of a micro-lens array used as an optical scattering layer. For an easier understanding, the numerals in the FIGS. 10 and 11 indicate identical parts. In this embodiment, a micro-lens array 30 has a composite structure of a transparent plastic layer 33 and a transparent resin 32. The transparent plastic layer 33 is formed on the inner surface of a first substrate 2 made of glass and has the same refractive index n1' as that of the glass, i.e., n1. Meanwhile, the transparent resin 32 is filled into numerous dimples 31 which are formed on the surface of the transparent plastic layer 33 by stamping. The refractive index of the transparent resin 32 is n2, which differs from that of the glass, i.e., n1. According to the embodiment shown in FIG. 10, the dimples 31 are formed by isotropically etching the glass using a mask. The manufacturing process of this embodiment is advantageous over the above technique in that the dimples 31 are formed by stamping the transparent plastic layer 33.

Figure 12:
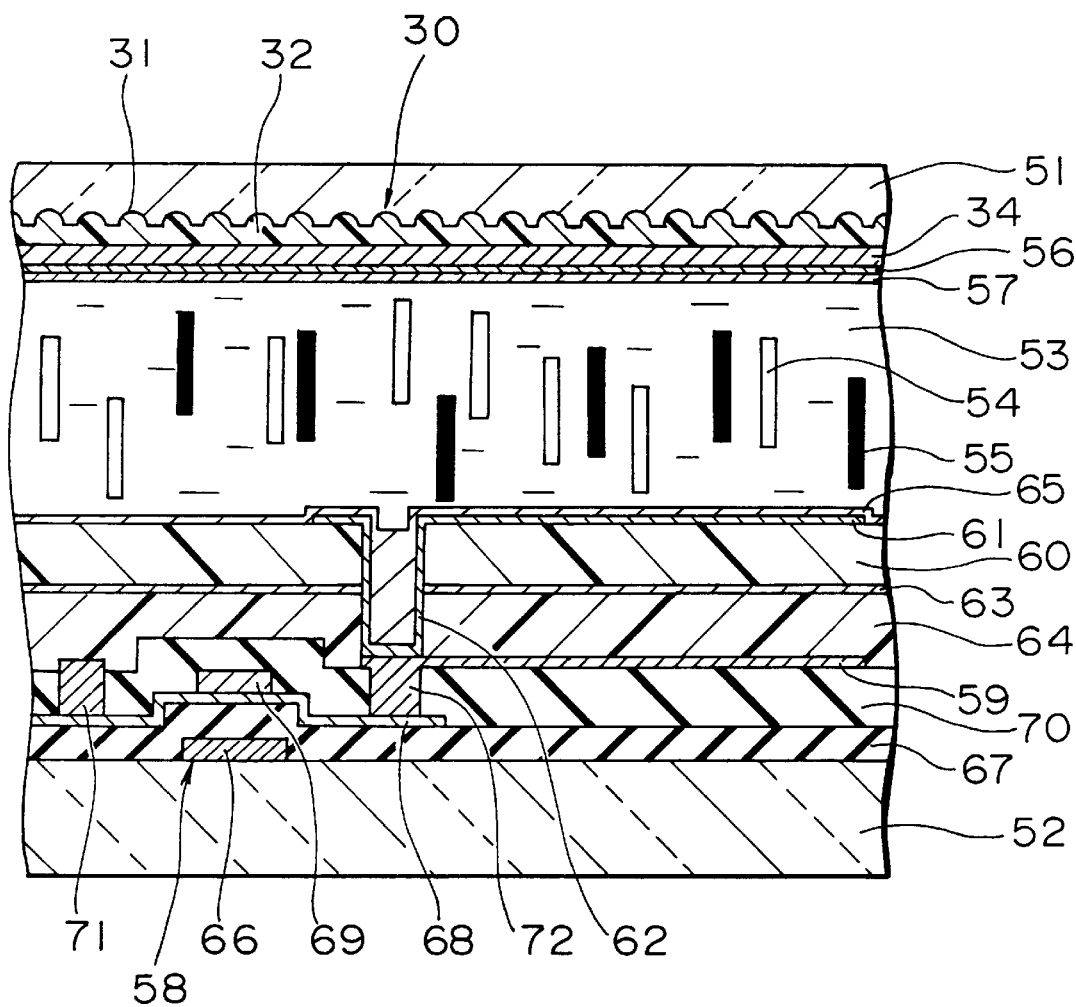
FIG. 12 is a fragmentary sectional diagram showing a practical example of a reflective guest-host liquid crystal display device incorporated into the present invention.

A practical application of the micro-lens array shown in FIG. 10 will be explained with reference to FIG. 12. This guest-host liquid crystal display device is composed of a pair of upper and lower substrates 51 and 52 joined together with a predetermined space therebetween, as is shown in FIG. 12. The upper substrate 51 is positioned at the incident side and made of a transparent material, such as glass. The lower substrate 52 is positioned at the reflection side and is not always required to be composed of a transparent material. The pair of substrates 51 and 52 hold a guest-host liquid crystal 53 therebetween. The guest-host liquid crystal 53 is predominantly composed of nematic liquid crystal molecules 54 having negative dielectric anisotropy and it also contains a dichroic dye 55 at a predetermined ratio. A color filter 34, a counter electrode 56, and an orientation layer 57 are formed on the inner surface of the upper substrate 51. The counter electrode 56 is a transparent conductive film formed from ITO or the like. The orientation layer 57 is a polyimide film, etc. and aligns the guest-host liquid crystal 53 in a perpendicular direction. However, the present invention is not limited to the above construction and the guest-host liquid crystal may be horizontally oriented, as is shown in FIG. 1. According to this embodiment, the guest-host liquid crystal 53 is perpendicularly aligned without applied voltage, and horizontally aligned with an applied voltage. A micro-lens array 30 is formed on the inner surface of the substrate 51. The micro-lens array 30 is composed of a transparent resin 32 which is filled into numerous dimples 31 formed by etching the inner surface of the substrate 51. The refractive index of the transparent resin 32 differs from that of the glass composing the substrate 51. According to this embodiment, the color filter 34 is arranged between the micro-lens array 30 and the counter electrode 56.

At least an optical reflective layer 59, a quarter wavelength plate 60, a pixel electrode 61, and a switching element which is composed of a thin-film transistor 58 are formed on the lower substrate 52. As a basic construction, the quarter wavelength plate 60 is film-formed above the thin-film transistor 58 and the optical reflective layer 59, and there is also provided a contact hole 62 connecting to the thin-film transistor 58. The pixel electrode 61 is patterned on the quarter wavelength plate 60. Therefore, sufficient electric field to be applied to the guest-host liquid crystal 53 can be generated between the pixel electrode 61 and the counter electrode 56. The pixel electrode 61 electrically connects to the thin-film transistor 58 via the contact hole 62 which has its opening on the quarter wavelength plate 60.

In this embodiment, the quarter wavelength plate 60 is composed of a uniaxially oriented polymer liquid crystal film. An undercoat orientation layer 63 is employed for uniaxially aligning the polymer liquid crystal film and is formed on the surface of a planarization layer 64 which covers the thin-film transistor 58 and the optical reflective layer 59. The quarter wavelength plate 60 is also formed above the planarization layer 64. The pixel electrode 61 electrically connects to the thin-film transistor 58 via the contact hole 62 penetrating the quarter wavelength plate 60 and the planarization layer 64. The optical reflective layer 59 separates into small segments corresponding to each of the pixel electrodes 61. These small segments of the optical reflective layer 59 connect to the corresponding pixel electrodes 61 at the same electric potential. Thus, unnecessary electric fields are not applied to the quarter wavelength plate 60 and the planarization layer 64 positioned between the segments and the pixel electrodes 61. The optical reflective layer 59 having a mirror surface is prepared by sputtering aluminum or the like. An orientation layer 65 is formed to cover the surface of the pixel electrodes 61 and is in contact with the guest-host liquid crystal 53 so as to control its orientation. In this embodiment, together with the opposed orientation layer 57, the orientation layer 65 aligns the guest-host liquid crystal 53 in the perpendicular direction. The thin-film transistor 58 has a bottom-gate structure such that a gate electrode 66, a gate insulating film 67, and a semiconductor film 68 are layered from the bottom in the given order. The semiconductor film 68 is made of a polycrystalline silicon, etc. and the channel region matching the gate electrode 66 is protected by a stopper 69 positioned above the region. The thin-film transistor 58 having the above structure is coated with an interlayer insulating film 70. A pair of contact holes are opened on the interlayer insulating film 70 and, through the corresponding contact holes, a source electrode 71 and a drain electrode 72 electrically connect to the thin-film transistor 58. An example of these electrodes 71 and 72 are those which are formed by patterning aluminum. The drain electrode 72 has the same electric potential as that of the optical reflective layer 59. The pixel electrode 61 electrically connects to the drain electrode 72 through the contact hole 62. A signal voltage is applied to the drain electrode 71.

As is mentioned in the above, according to the present invention, in a guest-host liquid crystal display device with quarter wavelength plate, an optical reflective layer which substantially specularly reflects the incident light is provided between a second substrate positioned at the reflection side and a quarter wavelength plate; and an optical scattering layer is provided between the first substrate positioned at the incident side and a guest-host liquid crystal layer so that the reflected light coming from the back is emanated to the front in a scattered manner. A bright display with a paper-white tone and high contrast is thereby achieved without changing the optical reflective layer from the specular reflection type to a diffuse reflection type. In some cases, reflective liquid crystal display devices with a bright full-color display can be obtained by using color filters. Further, the inverse reflective scattering is avoidable by using a micro-lens array as the optical scattering layer, thereby preventing the blurred black-tone and improving the contrast of the display. The optical scattering angle is readily controlled by suitably selecting the refractive index of the transparent resin used for the micro-lens array.

Figure 13:
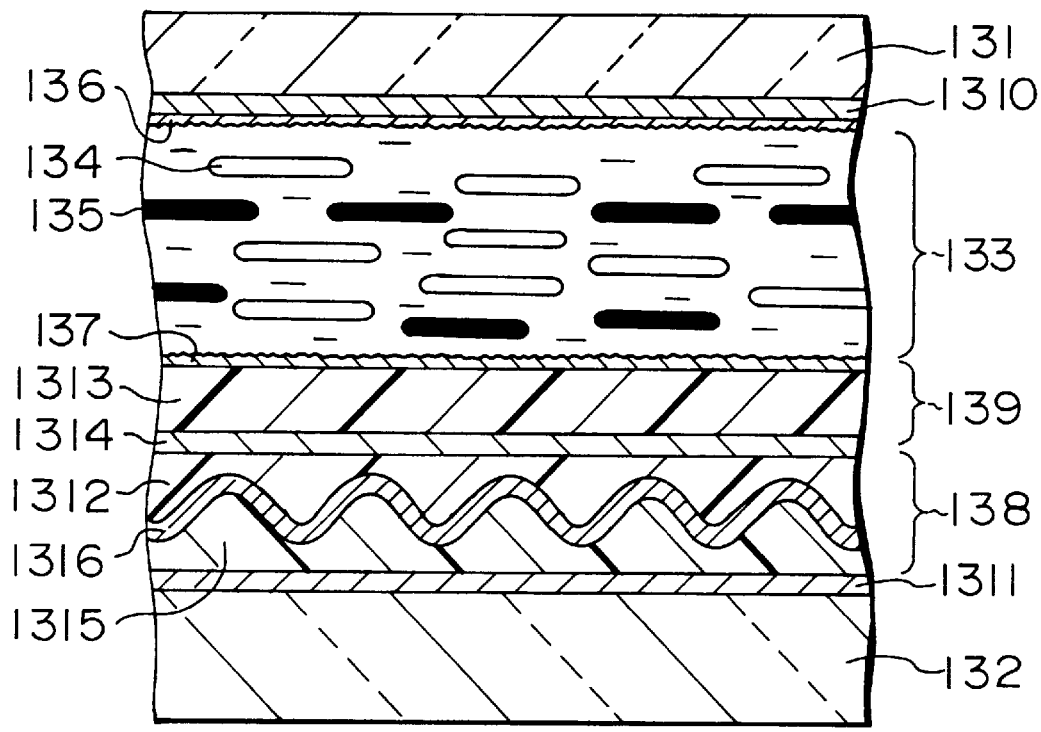
FIG. 13 is a fragmentary sectional diagram showing a basic structure of a reflective guest-host liquid crystal display device incorporated into the present invention.

An embodiment of a reflective guest-host liquid crystal display device having an optical reflective layer the surface of which scatters light will be explained below. FIG. 13 is a fragmentary sectional diagram showing a basic structure of a reflective guest-host liquid crystal display device of this embodiment. As is shown in FIG. 13, this device has a first substrate 131 positioned at the incident side and a second substrate 132 which is positioned at the reflection side and which is joined with the first substrate 131 with a predetermined space therebetween. Within the space, a guest-host liquid crystal layer 133 is provided at the side of the first substrate 131. The guest-host liquid crystal layer 133 is composed of a mixture of a nematic liquid crystal 134 and a dichroic dye 135, and is homogeneously aligned by upper and lower orientation films 136 and 137. Also within the space, an optical reflective layer 138 is provided at the side of the second substrate 132. Between the guest-host liquid crystal layer 133 and the optical reflective layer 138, a quarter wavelength plate 139 is provided. For applying voltage to the guest-host liquid crystal layer 133, electrodes 1310 and 1311 are formed at the side of the first substrate 131 and the side of the second substrate 132, respectively. In this embodiment, the upper electrode 1310 is formed on the inner surface of the first substrate 131 and the lower electrode 1311 is formed on the inner surface of the second substrate 132.

This embodiment is characterized in that the surface of the optical reflective layer 138 is roughened for scattering light. Thus, a display with a paper-white tone, which is a preferred tone for background, is achieved. In addition, since the reflection angle of the incident light has a relatively wide range, the angle of view increases. Thus a brighter display can easily be seen over a wide visual angle. In this embodiment, a transparent planarization layer 1312 for planarizing the roughness is provided between the optical reflective layer 138 and the quarter wavelength plate 139. The quarter wavelength plate 139 is composed of a polymer liquid crystal material 1313 which is uniaxially oriented along the surface of the planarization layer 1312. For uniaxially orienting the polymer liquid crystal material 1313, an undercoat orientation film 1319 is formed between the planarization layer 1312 and the quarter wavelength plate 139. The optical reflective layer 138 is composed of a roughened resin film 1315 and a metal film 1316, such as an aluminum film, which is formed on the surface of the resin film 1315. The resin film 1315 is a photosensitive-resin film which is unevenly patterned by a photolithographic process.

The photosensitive-resin film 1315 is formed by applying photoresist or the like over the entire surface of the second substrate 132. The resultant coating layer is subjected to exposure using a mask and then patterned into a cylindrical shape, etc. followed by heating for reflow. The photosensitive-resin film 1315 having a roughened surface is thereby reliably prepared. The metal film 1316 having an excellent optical reflectance is formed on the resultant roughened surface to the desired thickness. By setting the depth of the roughness to several $\mu$m, the optical reflective layer 138 can be whiten with excellent optical scattering characteristics. The planarization layer 1312 is formed on the optical reflective layer 138 for levelling the roughness. It is preferable to use a transparent organic material, such as an acrylic resin, for the planarization layer 1312. By the use of the planarization layer 1312, it becomes easier to reliably film-form and rub the undercoat orientation film 1314. Thus, the quarter wavelength plate 139 which is one of the most important element of the present invention can be formed with accuracy. If there is no planarization layer 1312, the roughness of the optical reflective layer 138 directly affects the quarter wavelength plate 139 and the desired optical characteristics can not be achieved. An orientation film 137 is formed on the quarter wavelength plate 139. In this display device, the orientation film 137 also serves as a passivation film (i.e. blocking layer) separating the guest-host liquid crystal layer 133 and the quarter wavelength plate 139 which is composed of the polymer liquid crystal material 1313. Without this blocking layer, the guest-host liquid crystal layer 133 and the polymer liquid crystal material 1313 readily become soluble in each other and exert adverse effect on the operation. In addition, the quarter wavelength plate 139 can serve as a color filter by dispersing dyes of the optical primaries, i.e., red, blue, and green, in separated regions.

Figure 14:
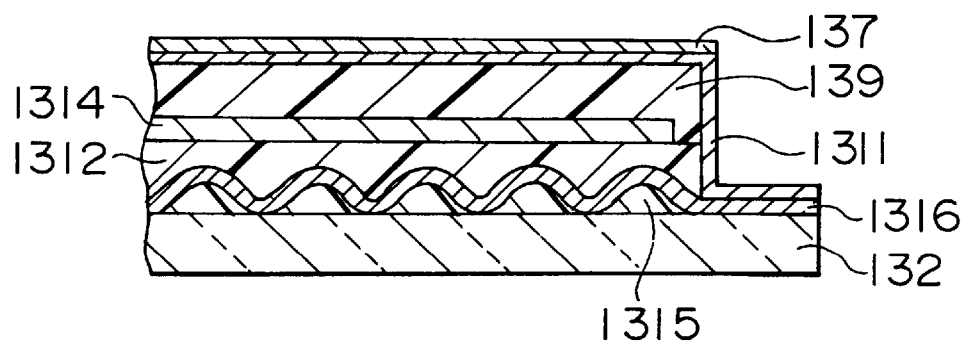
FIG. 14 is a fragmentary sectional diagram showing a modification of the optical scattering layer shown in FIG. 13.

FIG. 14 is a fragmentary sectional diagram showing a modification of the reflective guest-host liquid crystal display device shown in FIG. 13. For an easier understanding, the numerals in the FIGS. 13 and 14 indicate identical parts. In this modification, an electrode 1311 is formed on the surface of a quarter wavelength plate 139. Thus, it becomes possible to apply a sufficient driving voltage to a guest-host liquid crystal layer in contact with the surface of an orientation film 137, resulting in a clearer display. The electrode 1311 is in contact with a metal film 1316 such that it prevents the metal film 1316 from being at floating potential by fixing the electric potential of the film. The operation of the display device is thereby stabilized.

Figure 15A:
FIGS. 15A to 15F show manufacturing steps of a reflective guest-host liquid crystal display device incorporated into the present invention.

The manufacturing process of optical reflective layers and quarter wavelength plates will be described in detail with reference to FIG. 15. First, as is shown in FIG. 15A, a photosensitive-resin film 1315 is applied on the entire surface of a second substrate 132 made of glass, etc. For example, photoresist may be used for the photosensitive-resin film 1315.

Figure 15B:
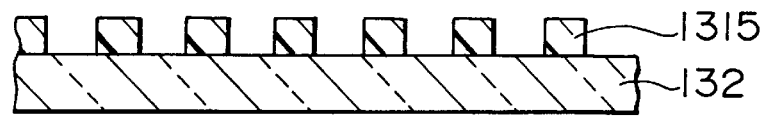

Then, the photosensitive-resin film 1315 is subjected to exposure using a prescribed mask and then patterned into a shape of dispersed cylinders or the like, as is shown in FIG. 15B.

Figure 15C:

Then, as is shown in FIG. 15C, the photosensitive-resin film 1315 is allowed to reflow by heating the second substrate 132. The dispersed-cylindrical shape is thereby gently sloped and, as a result, the surface of the photosensitive-resin film 1315 is roughened in the desired form.

Figure 15D:

As is shown in FIG. 15D, a metal film which is made of aluminum, etc. and which has an excellent reflectance is formed on the resultant roughened surface of the photosensitive-resin film 1315 to the desired thickness by vacuum-depositing or the like. By setting the depth of the roughness to several $\mu$m, the metal film 1316 can be whiten with excellent optical scattering characteristics.

Figure 15E:
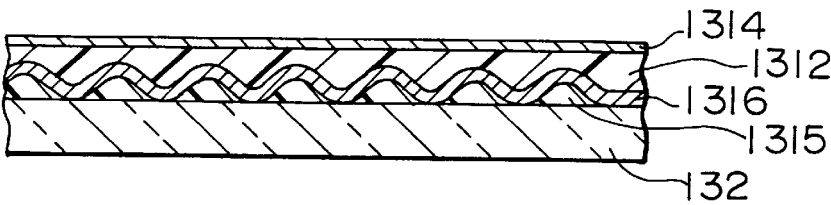

The surface of the metal film 1316 is leveled by a planarization layer 1312, as is shown in FIG. 15E. The planarization layer 1312 is formed by applying a transparent organic material, such as an acrylic resin, by spin coating or the like. Then, the surface of the planarization layer 1312 is coated with an undercoat orientation film 1314. The undercoat orientation film 1314 is rubbed in a predetermined direction, which procedure is reliably conducted because the undercoat orientation film 1314 is formed on the flat planarization layer 1312.

Figure 15F:
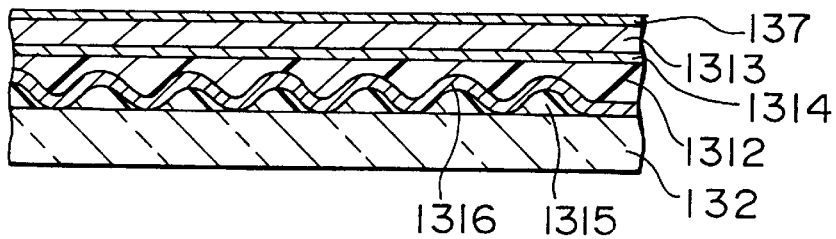

Finally, a polymer liquid crystal material 1313 is applied to the undercoat orientation film 1314, as is shown in FIG. 15F. For example, a polymer liquid crystal having side chains, such as a polymer having mesogen groups (i.e. a benzoate) as pendants, can be used for this material. The polymer liquid crystal is dissolved in a mixture of cyclohexane and methyl ethyl ketone (8:1) at 3 to 5% by weight. For example, the undercoat orientation film 1314 is spin-coated at 1,000 rpm with the resultant solution to form a polymer liquid crystal film thereon. The polymer liquid crystal is once heated to an optically isotropic state by heating the substrate. Then, passing thorough the nematic phase, the polymer liquid crystal is slowly cooled to room temperature by cooling the substrate. Since the polymer liquid crystal is aligned along the direction of rubbing of the undercoat orientation film 1314 in the nematic phase, the desired uniaxial orientation is achieved. The resultant uniaxial orientation is fixed by cooling the substrate to room temperature. According to the above-mentioned annealing, the liquid crystal molecules contained in the polymer liquid crystal material 1313 are uniaxially oriented, thus providing a desired quarter wavelength plate. Further, an orientation film 137, e.g. PVA film, is formed on the polymer liquid crystal material 1313. By rubbing the orientation film 137 in a predetermined direction, a homogeneous orientation can be attained in the guest-host liquid crystal layer in contact with the orientation film 137. The orientation film 137 is positioned between the polymer liquid crystal material 1313 and the guest-host liquid crystal layer, and it also serves as a passivation layer, i.e., blocking layer. The direction of rubbing of the orientation film 137 and that of the undercoat orientation film cross each other at 45°.

Figure 16:
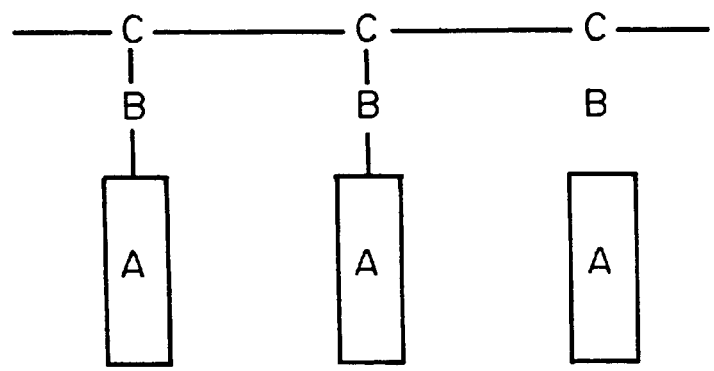
FIG. 16 shows an example of polymer liquid crystal materials composing a built-in quarter wavelength plate of a reflective guest-host liquid crystal display device incorporated into the present invention.
Figure 16:
Figure 16:
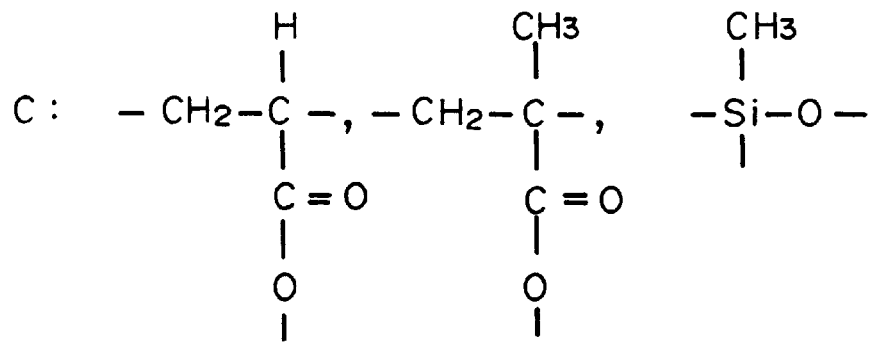

An embodiment of the polymer liquid crystal will be explained with reference to FIG. 16. The polymer liquid crystal contains rigid mesogen groups (constituent groups of the liquid crystal) A which have the same chemical structure as that of the core portion of low molecular liquid crystals. Through flexible side-chains B, such as polyethylene chains or polyoxyethylene chains, the mesogen groups A connect to the principal chain C of the copolymer which has a repeating unit of an acrylic, methacrylic, or methylsiloxane group. The above structure is called a pendant-type polymer liquid crystal having side-chains. This type of polymer liquid crystals exhibit the nematic, smectic, and cholesteric phases, as is similar to the low-molecular liquid crystals; and, in general, the range of the liquid crystal temperature is higher than that of the low-molecular liquid crystal, and the phase-transition temperature is raised with the molecular weight. The range of liquid crystal temperature can be lowered by introducing siloxane bonds to the skeletal principal chains of the polymer liquid crystal having side chains.

As is described in the above, according to the present invention, the surface of a built-in optical reflective layer of a reflective guest-host liquid crystal display device is roughened for scattering light. A bright and highly luminant display is thereby seen over a wide visual angle in a reflective guest-host liquid crystal display device. A reflective guest-host liquid crystal display device which is bright, highly bright, and easy to see can be thereby achieved. In addition, a planarization layer is formed on the surface of the optical reflective layer so as to level the roughness. Stable optical characteristics are attained by forming a quarter wavelength plate on the planarization layer.

What is claimed is:

1. A reflective guest-host liquid crystal display device comprising:

a first substrate through which light enters from a front;

a second substrate positioned behind said first substrate with a predetermined space therebetween;

a guest-host liquid crystal layer positioned within said space adjacent said first substrate;

a $\lambda/4$ phase shifter positioned within said space on said second substrate;

a reflective layer provided between said second substrate and said $\lambda/4$ phase shifter so as to reflect the incident light, said reflective layer scattering the light wherein said reflective layer comprises a resin film having an uneven surface and a metal film on said surface;

a planarization layer positioned between said reflective layer and said $\lambda/4$ phase shifter for planarizing the surface of said reflective layer; and an orientation film formed on the $\lambda/4$ phase shifter.

2. A reflective guest-host liquid crystal display device as set forth in claim 1 wherein said $\lambda/4$ phase shifter comprises a polymer liquid crystal material which is uniaxially oriented along the surface of said planarization layer.

3. A reflective guest-host liquid crystal display device as set forth in claim 1, wherein said resin film is a photosensitive-resin film unevenly patterned by a photolithographic process.

4. A reflective guest-host liquid crystal display device as set forth in claim 1, wherein said reflective layer and said electrode layer at the side of said second substrate are formed separately.

5. A reflective guest-host liquid crystal display device comprising:

a first substrate through which light enters from a front;

a second substrate positioned behind said first substrate with a predetermined space therebetween;

a guest-host liquid crystal layer positioned within said space adjacent said first substrate;

a $\lambda/4$ phase shifter positioned within said space on said second substrate;

a reflective layer provided between said second substrate and said $\lambda/4$ phase shifter so as to reflect the incident light, said reflective layer scattering the light wherein said reflective layer also integrally forms an electrode layer, and further wherein the reflective layer comprises a resin film which has an uneven surface and a metal film formed on said surface;

a planarization layer positioned between said reflective layer and said $\lambda/4$ phase shifter for planarizing the surface of said reflective layer; and an orientation film formed on the $\lambda/4$ phase shifter.

* * * * *